UNITED STATES PATENT OFFICE.

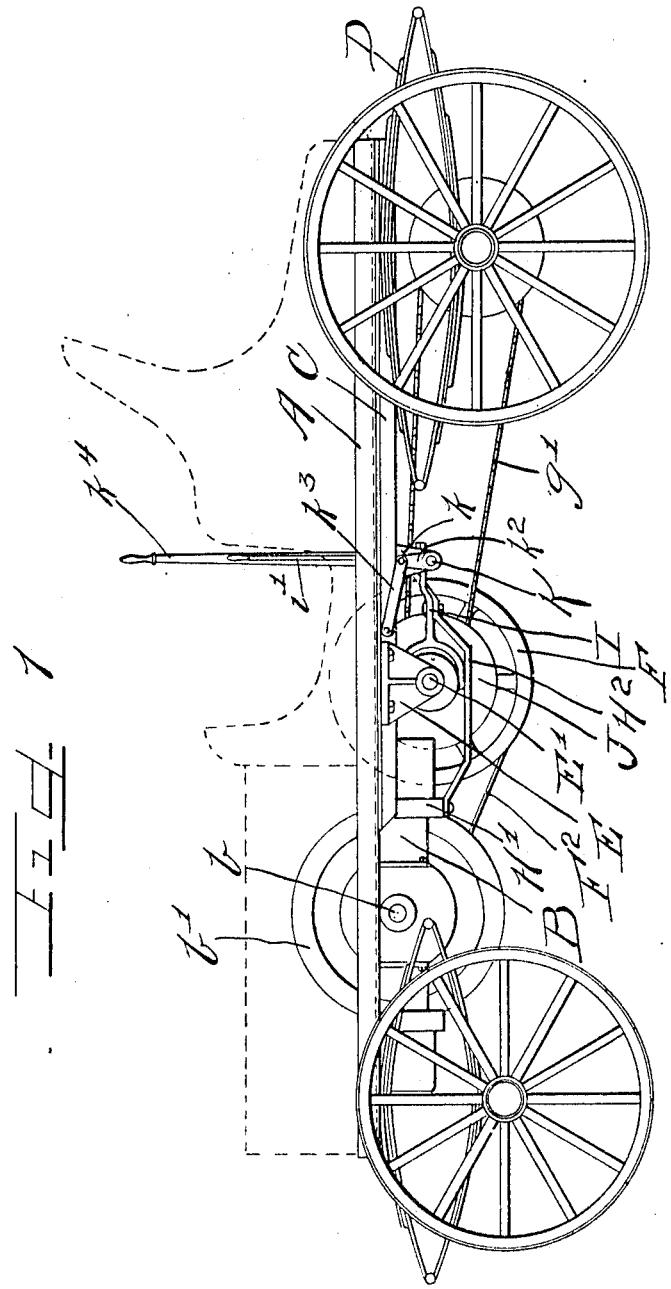

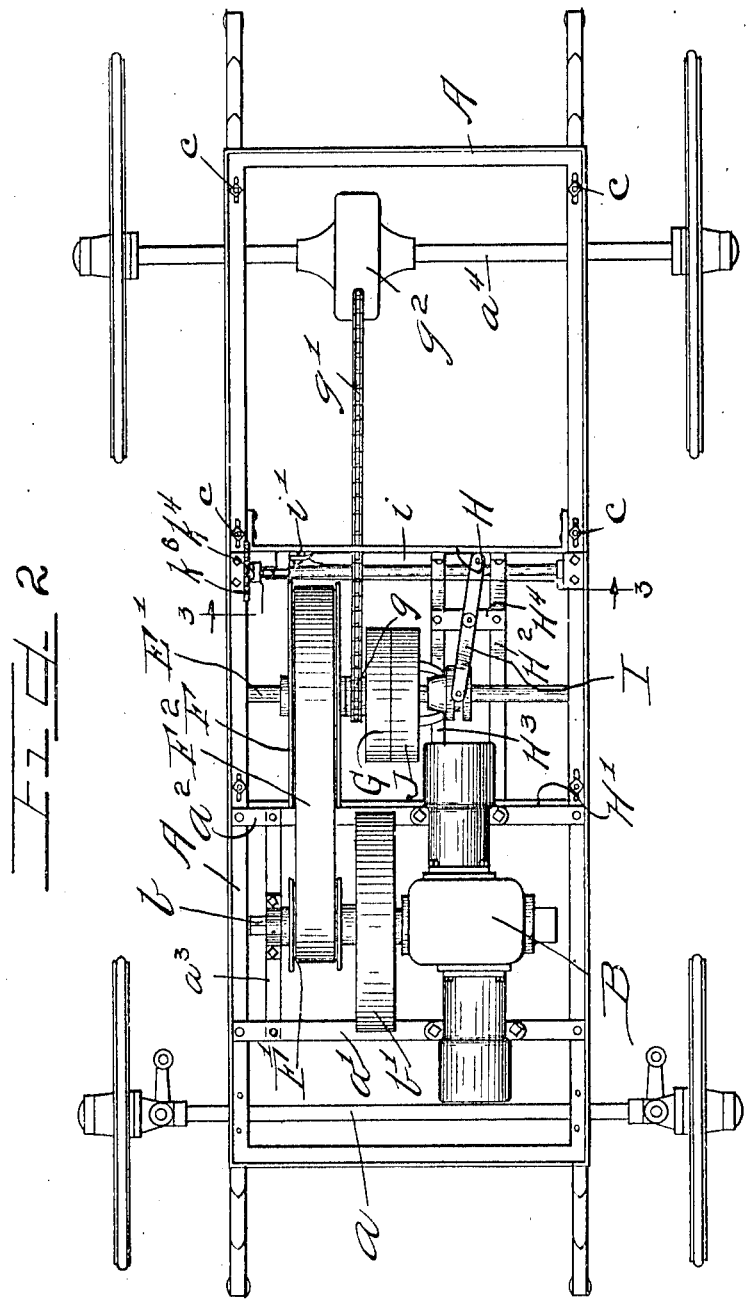

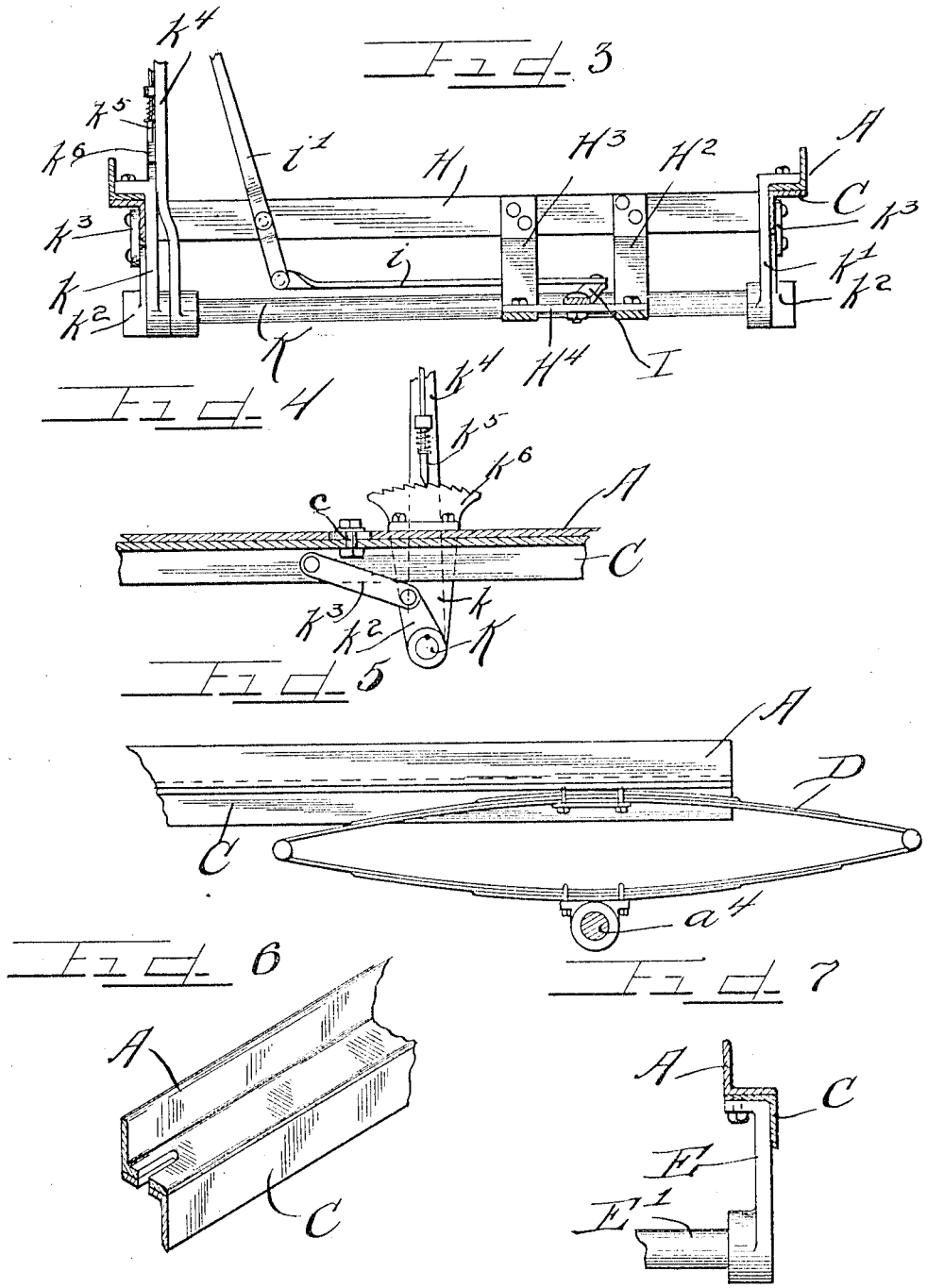

WILLIAM C. PRICE, OF CHICAGO, ILLINOIS, ASSIGNOR TO PRICE BELT AUTOMOBILE COMPANY, OF CHICAGO, ILLINOIS, A CORPORATION OF SOUTH DAKOTA.

MOTOR-VEHICLE.

949,158.  Specification of Letters Patent.  Patented Feb. 15, 1910.

Application filed July 13, 1907. Serial No. 383,652.

*To all whom it may concern:*

Be it known that I, WILLIAM C. PRICE, a citizen of the United States, and a resident of Chicago, Cook county, Illinois, have invented certain new and useful Improvements in Motor-Vehicles; and I do hereby declare that the following is a full, clear, and exact description of the same, reference being had to the accompanying drawings, and to the characters of reference marked thereon, which form a part of this specification.

This invention relates to improvements in motor vehicles and particularly to a motor vehicle in which the transmission mechanism and one of the axles are adjustable upon the chassis. Heretofore in vehicles of this class variation of speed has been secured wholly by a transmission consisting of gears or contacting friction disks. Also in vehicles of this class where a chain or belt drive is employed between the transmission shaft and axle it is desirable that its tension should be kept uniform under all conditions.

It is an object of this invention to provide a friction drive between the engine and transmission shaft by means of which the rate of speed of the vehicle may be controlled independently of the planetary or other transmission mechanism and in which the transmission shaft is adjusted toward or from the motor to vary the speed from minimum to maximum.

It is a further object of this invention to provide an adjustable frame, carrying the transmission shaft and a transmission mechanism and on which also is journaled one of the axles of the vehicle.

It is a further object of this invention to provide a driving connection between the transmission shaft and said axle whereby the proper tension is always maintained independently of the possible adjustment of the various parts in varying the speed.

It is further an object of this invention to provide in combination with a transmission shaft adjustable toward and from the motor for varying the rate of motion a transmitting and reversing mechanism carried on the transmission shaft.

It is also an object of this invention to provide extremely simple adjusting and shifting mechanism and to provide a very strong and neat appearing vehicle which can be manufactured so cheaply as to practically be within the reach of all users.

The invention consists of the matters hereinafter described and more fully pointed out and defined in the appended claims.

On the drawings: Figure 1 is a side elevation of a chassis of a vehicle embodying my invention. Fig. 2 is a top plan view thereof. Fig. 3 is an enlarged section taken on line 3—3 of Fig. 2 with parts omitted. Fig. 4 is an enlarged fragmentary detail of the frame shifting mechanism. Fig. 5 is an enlarged fragmentary detail of the frame and the method of attaching the spring thereto. Fig. 6 is an enlarged fragmentary detail of the rigid and adjustable frames. Fig. 7 is an enlarged fragmentary detail illustrating the manner of attaching the transmission shaft to the adjustable frame.

As shown in the drawings: A indicates the rigid main frame which is supported upon the front axle $a$ by means of the springs as is usual. Said frame is constructed of angle bars or other suitable members provided with transverse sills $a'$—$a^2$ upon which the motor or engine B of any suitable type is mounted and rigidly secured. The crank shaft $b$ of said engine as shown is directed transversely the frame and is journaled at the outer end in a suitable sill $a^3$ to afford rigidity and is provided with the usual balance wheel $b'$.

Supporting the frame A, at the rear thereof is a longitudinally adjustable sliding frame C, constructed of structural steel of suitable form such as angle bars and which is slidably secured to the upper or chassis frame A, by means of bolts $c$ which are engaged in one frame and extend through slots in the flange of the other as shown the frame A. Said adjustable frame as shown in Fig. 1 extends approximately two thirds of the length of the rigid frame and secured thereto in any preferred manner are the upper sections of the rear springs D the lower sections of which are secured to the rear axle $a^4$ in any preferred manner.

Oppositely disposed depending brackets E are rigidly bolted to a flange of the sliding frame C and journaled therein at its ends parallel the crank shaft is the transmission shaft E'. Trained around a flanged pulley or belt wheel F, on said transmission shaft E' and a corresponding smaller grooved pulley F' rigidly secured on the crank shaft is a belt F² of any suitable kind. Operatively connected with said pulley on said transmission shaft is a transmission mechanism G, of any suitable kind which is operatively connected to actuate the sprocket wheel $g$ journaled on the transmission shaft E'. A sprocket chain $g'$ is trained around said sprocket wheel $g$ and a corresponding sprocket wheel on the rear axle which is inclosed in any suitable casing $g^2$ which also incloses the differential gears, should a type of axle requiring the same be used.

Rigidly bolted or otherwise secured to the sliding frame C are transverse sills H—H' to which are rigidly secured the sills H²—H³. A bar H⁴ is rigidly bolted to the sills H²—H³ on which is pivoted a lever I having its forward end forked to engage the hub of a suitable clutch J acting on the transmission by means of which the direction of travel of the vehicle is reversed. Pivotally engaged to the opposite end of the lever I is a bar $i$, which extends longitudinally of the sill H, and to the opposite end of which a lever $i'$, is pivoted which in turn is pivoted to the sill H and extends in any suitable position for manual actuation.

For the purpose of shifting the frame C a shaft K is journaled in brackets $k$—$k'$, which are rigidly secured to the rigid frame A. A crank arm $k^2$, is rigidly engaged to each end of said shaft and pivoted to the upwardly directed end of said cranks $k^2$, are rods or bars $k^3$ which at their opposite ends are pivoted to the downwardly directed flanges of the adjustable frame C. A lever $k^4$ is rigidly secured on said shaft K which is provided with a detent $k^5$ adapted to engage the teeth in the segment rack $k^6$ as shown in Figs. 3 and 4.

The operation is as follows: Any suitable steering mechanism may be employed for guiding the direction of travel of the vehicle. In starting the engine, the frame C and transmission shaft E' together with the pulley F are shifted toward the engine. Inasmuch as the belt is now loose the frictional contact is so slight that motion will not be imparted to the transmission shaft. After starting the engine the lever $k^4$ is actuated shifting the frame C rearwardly thus tightening the belt F² and imparting motion to the transmission shaft. The transmission mechanism G which may be of any well known type normally actuates the transmission chain or cable $g'$ to impart a forward motion of the vehicle at different speeds and to reverse the direction of travel and vary the speed by means of the transmission mechanism the lever $i'$ is actuated.

It is seen that when shifting the frame C the driven axle is also shifted and thus the tension on the chain is kept uniform. Furthermore the speed is perfectly controlled by shifting the sliding frame and any speed capable of being developed in the engine or motor employed is obtainable by simply varying the frictional engagement of the belt F² and pulleys F—F' and that by shifting the pulley F forward sufficiently the same has the effect of a clutch in cutting out the engine.

Any suitable brake may be employed with a suitable hand or foot lever and many details of construction may be varied without departing from the principles of this invention and I therefore do not desire to limit this application for patent otherwise than necessitated by the prior art.

I claim as my invention:

1. A motor vehicle comprising a single frame consisting of two sections overlapping at their inner ends and slidably secured together, an engine carried on the front section, transmission mechanism carried on the rear section, an axle adjustable with the transmission mechanism, flexible drive connections between said axle and transmission mechanism and means for moving the adjustable section of the frame.

2. In a device of the class described the combination with a single frame having one end adjustable relatively to the other, a motor carried on the rigid end of the frame, a transmission shaft carried on the adjustable end of the frame, a flexible frictional driving connection between the engine shaft and transmission shaft, an axle connected with the adjustable end of the frame, a flexible transmission drive between the transmission shaft and axle, means for actuating the adjustable end of the frame to vary the tension of the driving connection and adapted to maintain uniform tension of the flexible transmission drive, means on the transmission shaft for reversing the drive and means carried by the adjustable end of the frame for actuating said reversing means.

3. In a device of the class described a frame comprising a rigid section and an adjustable section, an axle secured to each section, an engine secured to one of said sections, a transmission mechanism secured to the other section, a flexible driving connection between the engine and transmission mechanism, a shaft journaled to the rigid section, means connecting each end of said shaft with the corresponding side of the adjustable section and means for rotating the shaft to move the adjustable section longitudinally of the rigid section of the frame.

4. In a device of the class described the combination with a frame of an engine or motor thereon, an adjustable frame, a transmission shaft thereon, friction means adapted to drive the transmission shaft from the engine shaft, mechanism for shifting the frame for varying the friction engagement and controlling the rate of drive, an axle carried by each frame and flexible connections between the transmission shaft and the rear axle having the same tension in any adjustment of the axle and transmission shaft.

5. In a device of the class described a rigid frame, a motor thereon, an adjustable frame supporting part of the rigid frame, a transmission shaft journaled to the adjustable frame, driving means connecting the same and engine shaft, a transmission mechanism on said shaft, a reversing mechanism thereon and a lever for actuating the reversing mechanism.

6. In a device of the class described a rigid frame, a motor thereon, an adjustable frame supporting the rear of the rigid frame, a shaft journaled to the adjustable frame, driving means connecting the same and engine shaft, a transmission mechanism on said shaft, a reversing mechanism thereon, a lever for actuating the reversing mechanism, driving means connecting the first named shaft and an axle of the vehicle, a shaft supported by the rigid frame, means connecting the same and the adjustable frame and means actuating the shaft.

7. In a device of the class described a rigid motor frame, an adjustable transmission frame, a transmission shaft thereon, flexible driving connections between said shaft and the motor shaft, means for shifting the adjustable frame to vary the rate of drive or to prevent transmission of motion by said flexible connection, flexible transmission means between the transmission shaft and an axle and reversing mechanism on the transmission shaft.

In testimony whereof I have hereunto subscribed my name in the presence of two subscribing witnesses.

WILLIAM C. PRICE.

Witnesses:
K. E. HANNAH,
J. W. ANGELL.